Patented Oct. 27, 1931

1,829,029

UNITED STATES PATENT OFFICE

WILLIAM F. ZIMMERLI, OF AKRON, AND WALDO L. SEMON, OF CUYAHOGA FALLS, OHIO, ASSIGNORS TO THE B. F. GOODRICH COMPANY, OF NEW YORK, N. Y., A CORPORATION OF NEW YORK

COMPOSITION OF MATTER AND METHOD OF MAKING SAME

No Drawing. Application filed October 7, 1927. Serial No. 224,759.

This invention relates to a composition of matter which may be employed as a substitute for chicle in chewing gum, particularly to a composition composed of rubber, oil and pigment and to a method of producing such chicle substitute.

Heretofore it has been the practice to utilize as chewing gum bases a number of natural rubbery materials, such as gum chicle, Pontianac, Gutta-Siak, etc., the supplies of these raw materials varying widely in their physical properties so that it is now necessary to vary the proportions of other materials to be added to the gum base and the processing of the batch for any lot of raw material. The non-uniformity of the raw gums tends toward non-uniformity in the finished product and greatly increases the expense of manufacture of the chewing gum products therefrom.

The purpose of the present invention is to produce from abundant raw material of standard quality a chicle substitute which will have uniform physical properties, which will be less expensive than the natural chicles, and which will permit standardization in process of manufacture.

This invention is based on the discovery that a composition of matter consisting of one volume of rubber, three to six volumes of oil and two to four volumes of an innocuous pigment forms an excellent chicle substitute. Such a composition may be made by one of two methods: (a) The oil and pigment may be added to an aqueous dispersion of rubber and the mix subsequently dried, or (b) the pigment may be mixed into a cement made from the rubber and oil. The oil may be either of vegetable or mineral origin but preferably we use a tasteless purified mineral oil. The filler may be any powdered harmless pigment, preferably pigments classified as insoluble in water. We may also add a water-insoluble soap to maintain the pigment in the nonaqueous phase.

Referring to one specific embodiment of our invention, we mix forty-five parts by weight of tasteless mineral oil, into an aqueous dispersion of rubber, such as natural or concentrated latex or artificial concentrated aqueous dispersion of rubber, having a rubber content of ten parts by weight.

To this is then added forty-five parts of carbon black which has been moistened with water, and the whole thoroughly intermixed. The moisture is now largely removed by drying the batch in any suitable manner, as by milling on hot corrugated rolls. The resulting product is a plastic waxy material which has "chewing" properties almost identical with gum chicle.

Alternately a dispersion of rubber in oil may be used as the starting material. The following example is illustrative of such a chicle substitute. Into a dispersion of twenty parts by weight of pale crepe rubber in one hundred parts of mineral oil there is intimately admixed fifty parts of light magnesia and fifty parts of whiting. This batch produces a plastic waxy material similar to gum chicle in chewing properties.

In making the chewing gum base of the preceding example, it has been found desirable to add during mixing, five to ten parts of a water-insoluble soap such as magnesium oleate, since this ingredient tends to prevent the pigment from chewing out of the base. The addition of a water-insoluble soap is however not essential.

It is to be understood that it is necessary in the manufacture of chewing gum to add to the chicle substitute of the above examples sweeteners, flavoring and other modifiers commonly employed in the manufacture of gums and that such ingredients may be added at the time of admixing the pigments with the rubber-oil mixture or after the gum chicle substitute has been prepared. It is also to be understood the chewing gum bases herein above described may be compounded in varying proportions with any of the well-known chewing gum bases, such as chicle, Pontianac, etc.

Numerous modifications and variations may be made in the herein described process and in the ingredients entering into the chicle substitute without departing from the principles of this invention and we do not therefore intend to limit this invention to the specific ingredients or to the specific processes hereinabove set forth.

We claim:

1. As a chicle substitute, a plastic, waxy composition substantially free from water-soluble colloids comprising an intimate admixture of rubber with substantial proportions of a liquid oil and an innocuous pigment.

2. As a chicle substitute, a plastic, waxy composition substantially free from water-soluble colloids comprising an intimate admixture of rubber with a water-insoluble soap and substantial proportions of a liquid oil and an innocuous pigment.

3. As a chicle substitute, a plastic, waxy composition substantially free from water-soluble colloids comprising an admixture of rubber with a liquid oil and an innocuous water-insoluble pigment, the oil and the pigment each occupying a greater proportion by volume of the mixture than the rubber.

4. As a chicle substitute, a plastic, waxy composition substantially free from water-soluble colloids comprising an admixture of rubber with substantial proportions of a tasteless, liquid, mineral oil and an innocuous pigment.

5. As a chicle substitute, a plastic, waxy composition substantially free from water-soluble colloids comprising an admixture of rubber with substantial proportions of a liquid mineral oil and carbon black.

6. As a chicle substitute, a plastic, waxy composition substantially free from water-soluble colloids comprising substantially one part by volume of rubber, three to six parts by volume of liquid oil, and two to four parts by volume of an innocuous pigment.

7. A chewing gum made from a plastic, waxy chicle substitute substantially free from water-soluble colloids, the said chicle substitute comprising an intimate admixture of rubber with substantial proportions of a liquid oil and an innocuous pigment.

8. As a chicle substitute, a plastic, waxy material substantially free from water-soluble colloids comprising an admixture of a liquid dispersion of rubber with substantial proportions of a liquid oil and an innocuous pigment, from which admixture volatile constituents have been removed.

9. As a chicle substitute, a plastic, waxy material substantially free from water-soluble colloids comprising an admixture of rubber latex with a tasteless liquid mineral oil and an innocuous pigment, from which admixture water has been removed, the oil and pigment each being present in such proportions as to occupy a substantially greater volume than that of the rubber alone.

10. The method of producing a chicle substitute comprising admixing rubber with substantial proportions of a liquid oil, and thoroughly dispersing through the rubber-oil mix an innocuous pigment, to produce a plastic, waxy material, in the substantial absence of water-soluble colloids.

11. The method of producing a chicle substitute which comprises admixing an aqueous dispersion of rubber with substantial proportions of a liquid oil, thoroughly dispersing in the rubber-oil mix substantial proportions of an innocuous pigment, and subjecting the resulting mix to an evaporative action to remove in major part the liquid of the rubber dispersion, in the substantial absence of water-soluble colloids.

12. The method of producing a chicle substitute which comprises admixing rubber latex with a liquid, tasteless, mineral oil, and an innocuous pigment, in such proportions that the oil and the pigment each occupy a greater proportion by volume of the mixture than the rubber, and subjecting the resulting mix to an evaporative action to remove in major part the water content of the latex, in the substantial absence of water-soluble colloids.

13. The method of producing a chicle substitute which comprises admixing intimately a liquid dispersion of rubber with substantial proportions of a liquid oil and carbon black, and subjecting the resulting mix to an evaporative action to remove in major part the liquid of the rubber dispersion, in the substantial absence of water-soluble colloids.

14. The method of producing a chicle substitute which comprises admixing intimately rubber latex, a water-insoluble soap, and substantial proportions of a tasteless, liquid mineral oil and an innocuous pigment, and subjecting the resulting mix to an evaporative action to remove in major part the water content of the latex, in the substantial absence of water-soluble colloids.

15. The method of producing a chicle substitute which comprises intimately admixing one part by volume of rubber, three to six parts by volume of a liquid oil, and two to four parts by volume of an innocuous pigment, in the substantial absence of water-soluble colloids.

16. The method of making chewing gum consisting in producing a chicle substitute by intimately admixing rubber with substantial proportions of liquid oil and innocuous pigments in the substantial absence of water-soluble colloids, and adding to the chicle substitute sweeteners, flavoring and modifiers.

In witness whereof we have hereunto set our hands this 5th day of October, 1927.

WILLIAM F. ZIMMERLI.
WALDO L. SEMON.